United States Patent
Derezinski

[19]

[11] Patent Number: 6,164,810

[45] Date of Patent: *Dec. 26, 2000

[54] VENTED SINGLE STAGE BARRIER SCREW WITH A GAS VENT HOLE AND AXIAL BORE IN THE SCREW FOR VENTING GASES

[75] Inventor: Stephen J. Derezinski, Penfield, N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/154,318

[22] Filed: Sep. 16, 1998

[51] Int. Cl.[7] .......................................................... B29B 7/84
[52] U.S. Cl. ................................. 366/75; 366/88
[58] Field of Search .................. 366/75, 79, 88, 366/89, 323; 425/203

[56] References Cited

U.S. PATENT DOCUMENTS

| | | |
|---|---|---|
| 2,774,105 | 12/1956 | Bernhardt . |
| 2,992,679 | 7/1961 | Twaddle . |
| 3,524,222 | 8/1970 | Gregory et al. . |
| 3,593,843 | 7/1971 | Hill . |
| 3,902,704 | 9/1975 | Ishibashi et al. . |
| 3,986,709 | 10/1976 | Vermeulen . |
| 3,992,500 | 11/1976 | Kruder et al. . |
| 4,128,341 | 12/1978 | Hsu . |
| 4,478,519 | 10/1984 | Guibert . |
| 4,637,790 | 1/1987 | Klein . |
| 4,802,140 | 1/1989 | Dowling . |

*Primary Examiner*—Charles E. Cooley
*Attorney, Agent, or Firm*—Mark G. Bocchetti; Arthur H. Rosenstein

[57] ABSTRACT

A barrel contains an extruder conveying screw which has a drive end, a feed section, a melting section and a pumping section wherein the screw has a vent hole located from 0 to 2 screw diameters from the beginning of the feed section. An axial bore in the screw vents gases from the barrel through the gas vent hole and into the axial bore.

7 Claims, 3 Drawing Sheets

VENTED SINGLE STAGE BARRIER SCREW WITH A GAS VENT HOLE AND AXIAL BORE IN THE SCREW FOR VENTING GASES

FIELD OF THE INVENTION

This invention relates to a single screw extruder for polymer extrusion comprising a means for withdrawal of volatiles from the polymer in the extruder.

BACKGROUND OF THE INVENTION

In the past, it has been common to extrude hygroscopic, synthetic resins, such as ABS (acrylonitrile-butadiene-styrene resins), into finished products. However, such extrusion has in the past been preceded by a dehumidifying procedure in which the hygroscopic resins are pre-dried for several hours. When the dehumidified resins are extruded through a single vented extruder, a finished product substantially free of pock marks, dimples, streaks, surface roughness, and poor gloss results. A good dehumidification system is not only expensive but also requires a substantial electrical power supply. In addition, the systems occupy valuable floor area in manufacturing operations.

When the hygroscopic resinous material is dehumidified in a hopper dryer, the temperature must be carefully controlled to prevent overheating. Even with careful temperature control, experience has shown an occasional batch of material will become overheated and fuse together causing both loss of time and waste of material.

Another frequent problem with hopper dryers is the difficulty in maintaining uniformly dehumidified material for subsequent use in an extruder. This problem results from the non-homogeneity of moisture content in hygroscopic particulate material.

Previous combinations of a dryer and an extruder have inadequately accommodated the need for rapid color changes often encountered in production operations. The inadequacy results directly from the lead time required to dry a differently colored stock of hygroscopic material for extrusion.

Some rotary screw extruders in the past have employed reduced pressure vent sections to remove volatiles from the extrudate. Typically, however, these vented sections are pressure sealed from one another such as the vented sections of U.S. Pat. No. 2,992,679 which issued to W. W. Twaddle. But, such sealing between sections reduces the effective devolatilization length and is ineffective for use to extrude hygroscopic synthetic resinous materials.

Other extruders have employed continuous devolatilization sections in the extruder screw such as disclosed by U.S. Pat. No. 3,524,222 to Gregory et al. This type of extruder results in nonuniform flow rates which are unsuitable for the extrusion of high quality finished products. Nonuniform flow rates are aggravated by pressure gradients which often occur in long vent sections. Moreover, the extrudate in such extruders frequently develops thermal nonuniformity which is induced by volatile substances undergoing a liquid-vapor phase change. Since viscosity is highly dependent on temperature, such thermal non-uniformity also has an adverse effect on extruded products.

Currently the PET extrusion process uses resin in powder form. The extruder screw needed to process the powder is a two-stage type which means that it requires a special extraction section for vapor and volatile removal to a vacuum source. Without the extraction, bubbles will appear in the product.

Other producers of PET use resin in the form of pellets. This allows a barrier type of screw design because the porosity of the pellets permits vapor and volatile materials to escape through the pellets to the feed hopper counter to the direction of polymer flow. The barrier screw is known to be more efficient, more stable, more versatile, and have greater potential rate than the standard two-stage screw used for PET powder which is comprised of five separate sections: 1) feed; 2) compression; 3) metering; 4) extraction; and 5) pumping. However, PET powder in a conventional barrier screw is compacted so that vapor can not escape through the solid feed as it does for pellet feed.

In general, volatile and vapor extraction is commonly done during extrusion for single (and twin-screw) types of extruders. Most common is the venting through a port in the barrel wall such as described in U.S. Pat. Nos. 3,992,500 and 3,593,843. However, this has the restriction that the vent location is fixed. Venting through the screw is an alternative that allows positioning the vent optimally for each screw.

Screw venting has been accomplished through a bore in the screw to a vent as described in U.S. Pat. Nos. 4,478,519 and 2,774,105 or vents as described in U.S. Pat. No. 3,986,709 in the melt channel. In each case a voided volume is created in the melt flow to allow gases to accumulate and be removed via the vent(s) and screw bore. In the first device, centrifugal force is used to separate the gases from the extrudate. In the second device, walls in the flow channel divert the polymer to accomplish a voided volume for the vents. In the third example, a deep channel section for the melt is provided that will only partially fill at the prevailing rate. Venting is then provided in the deep channel section (extraction section). This third example is typical of current art for PET powder processing. For present purposes, extra volume is required for extraction of gases, which requires extra screw length at the expense of rate and efficiency.

SUMMARY OF THE INVENTION

It is an object of the present invention to provide a novel rotary screw extruder which minimizes or reduces problems in the extrusion of synthetic resinous materials.

It is a more particular object of this invention to provide a novel rotary screw extruder which accepts hygroscopic material in particulate form and which plasticizes, dries, and devolatilizes the hygroscopic material while it is being extruded in a continuous operation.

It is another object of the present invention to provide a novel rotary screw extruder which mechanically works the plasticized material while it is being devolatized and dried to maintain a more uniform temperature in the material.

Yet another object of the present invention is to provide a novel rotary screw extruder in which the flow rate of hygroscopic, resinous material is highly uniform throughout the extrusion process.

Still another object of the invention is to provide a novel rotary screw extruder which includes a gas separation zone.

In order to achieve the objects described above, a single stage barrier screw is modified to contain a vent hole for the purpose of extracting gases from the polymer without the addition of a special extraction section. This enables the vapor and volatile materials to be removed from PET powder with the rate and efficiency potential of the barrier type design.

BRIEF DESCRIPTION OF THE DRAWINGS

Other objects and advantages of the present invention will become apparent to those skilled in the art when the appended claims are read in connection with the following detailed description and the accompanying drawings wherein like reference numerals have been applied to like elements and wherein:

For a better understanding of the present invention, together with other and further objects, advantages and capabilities thereof, reference is made to the following detailed description and appended claims in connection with the preceding drawings and description of some aspects of the invention.

DETAILED DESCRIPTION OF THE INVENTION

Figure 1:
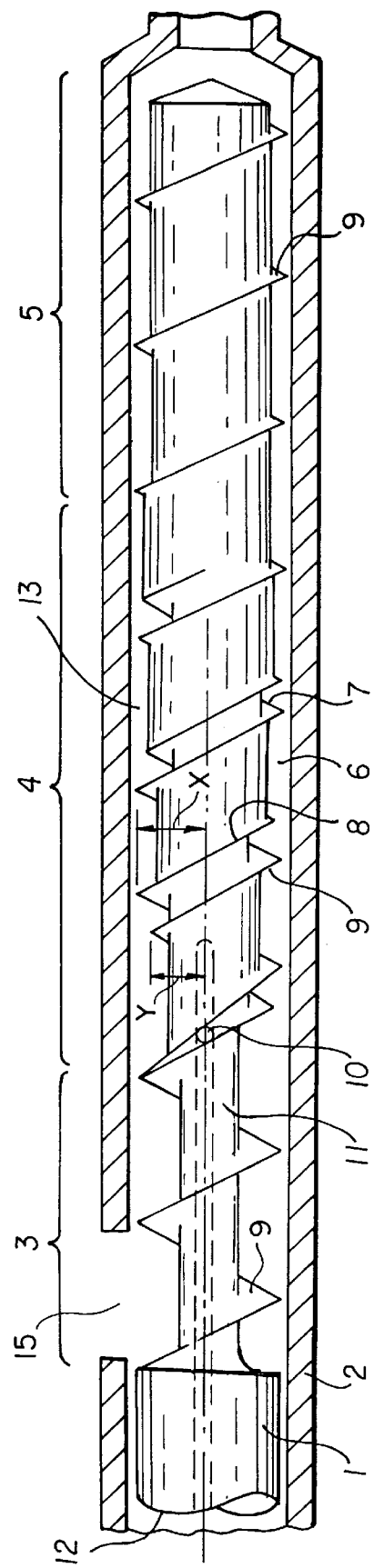
FIG. 1 is a cross section view of a vented single stage barrier screw.

Illustrated in FIG. 1 is the arrangement of a single stage barrier screw 1 in an extruder barrel 2. It contains a feed section 3, a melting section 4, and a pumping section 5. Screw 1 includes a pumping flight 9. The melt section 4 consists of a solids and melting channel 6 and a melt pumping channel 7. The melt section 4 of screw 1 also has two flights, a barrier flight 8 and a pumping flight 9. There is a feed opening 15 into the feed section 3 of barrel 2. This is a typical arrangement for a barrier screw. Pumping flight 9 extends through the pumping section 5 of screw 1.

The novel feature of the present invention is the addition of a vent hole 10 at the beginning of the melt section 4 of the screw 1. The vent hole 10 is connected to a bore 11 in the screw 1 from the drive end 12. The bore 11 is connected to a vacuum through a rotary union. A vacuum is the preferred method for polyethylene terephthalate (PET) powder, but the vent may need only be to atmospheric pressure for some other polymers such as polyethylene, polyethylene naphthalate and the like. For this later case, no rotary union would be necessary.

The standard barrier design may also be modified to include a deeper melt pumping channel 7. Normally, the melt pumping channel 7 in the barrier screw 1 is relatively shallow at the start of melting 4. It then progressively becomes deeper as it approaches the pumping section 5. However, for the purposes of this invention, the entire melt pumping channel 7 may be about the same depth as the feed section to accommodate both the flow of melt and the counter flow of volatile materials and vapor to the vent hole 10. This feature provides the needed volume for extraction without sacrificing performance characteristics of the barrier type design.

The vent hole 10 location is at the end of the solid feed section 3 where melting is just beginning. Previous art puts the extraction vent at a point of fully melted material 5. The advantages of locating the vent hole 10 near the end of feed section 3 are that it is less likely to contact melted polymer and foul, and the higher pressures are possible without forcing polymer back to the vent hole 10. This later case is known as flooding the extruder, and it can be a problem in processing for high delivery pressure. It is unexpected that the degassing would function with the vent hole 10 located at the end of the solid feed area 3, but the deeper melt pumping channel 7 provided sufficient path between the melted material and the vent hole 10 for vapor to reach the vent hole 10. Vent hole 10 can be located from about 0 to about 2 screw diameters from the end of feed station 3.

The two flight heights 8 and 9 near the vent hole 10 are staggered. At the beginning of the melting section 4 and for approximately two barrel-diameters the flight 8 which is pushing the melting solid feed (barrier flight) is higher than the pumping flight 9 that is to push the melted resin. That is, noting that, as depicted in FIG. 1, the radial height of barrier flight 8 is shown as x and the radial height of pumping flight 9 is shown as y, x is greater than y for a portion of the melting section 4 equal to approximately two diameters of barrel 2. This arrangement minimizes the amount of resin that can reach the melt pumping channel 7 which contains the vent hole 10. The lower pumping flight 9 permits any resin that does clear the barrier flight 8 to return to the solids and melting channel 6. This minimizes the amount of resin that will be trapped in the melt pumping channel 7 which contains the vent hole 10.

At the position downstream of two barrel-diameters 13, the flight 8 and 9 diameters can be reversed. The flight 8 that is pushing the melting solid feed (barrier flight) is made smaller in diameter than the flight 9 that is pumping the melted resin. At this point, normal barrier melting and conveying begin where melting occurs in solids and melting channel 6 and passes over the barrier flight 8 to melt pumping channel 7.

Normal venting of the two-stage screw requires a vent stack in the screw 1. This stack is known to accumulate polymer and become plugged. For this invention, the vent hole 10 can be made larger than that of a vent stack for instance as large or larger than the screw bore. It can also be made to be flush with the bottom of the melt pumping channel 7, and blended to the melt pumping channel 7 in the direction of flow. That would permit any material that may be contained in the volatile flow from accumulating around the vent hole 10 and plugging it. Contained material will proceed to the vent piping system through the bore 11. The vent piping system is made to be easily disassembled for cleaning in the event that it eventually becomes fouled.

Lack of need for a vent stack would not be expected from the current prior art because the vent location at or near the pumping section 5 would soon plug with a melted material. This is particularly true during starting or other transient conditions.

Also, multiple vent holes 10 (not shown) can be used to minimize the probability of plugging.

The following example is shown to illustrate the invention.

EXAMPLE 1

An extruder of 63 mm diameter and 30:1 L/D was operated to measure the performance of the vented barrier screw. Data for the same extruder with a screw of the conventional production type which comprises feed, compression, metering, extraction, and pumping were also available. Data for three polymers were measured: 1) PET powder, 2) PET pellets, and 3) PEN pellets. All three of these polymers are of commercial interest, and a single screw that would process all three would be very desirable (eliminates screw changes for product changes).

Figure 2:
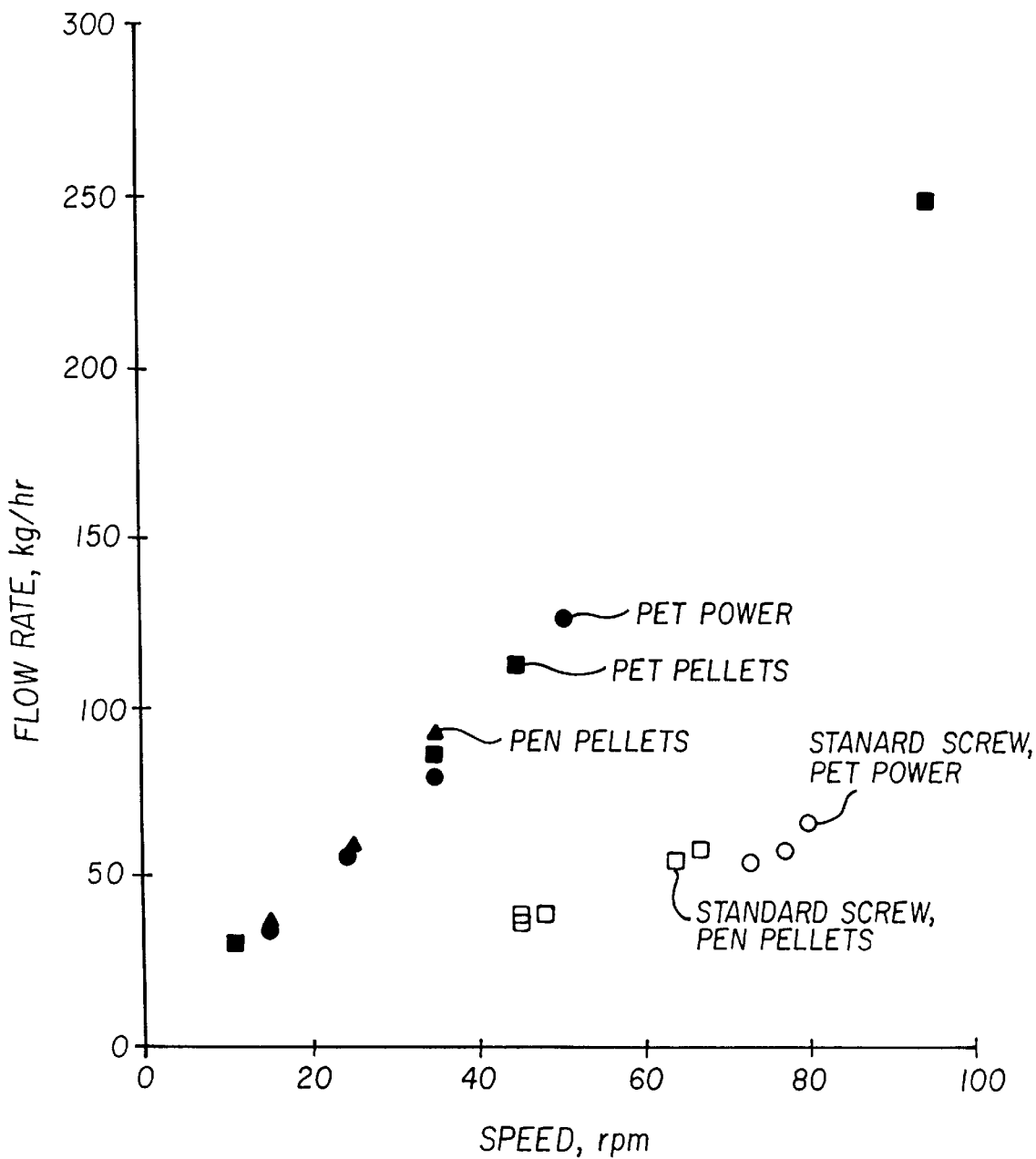
FIG. 2 is a graph of flow rate versus speed for the vented barrier screw and a standard screw.

Flow rate and power are the two most important parameters for the functioning of the screw. Flow rate data for a 63 mm extruder with vented single stage barrier are shown in FIG. 2. A flow rate of 126 kg/hr of powder PET was obtained at 55 rpm. Drying supply capacity for powder resin prevented attempting higher rates. However, a greater supply of pellets was available for testing up to a rate of 248 kg/hr at 95 rpm.

Data for a standard two-stage vented screw for PET powder for this same extruder are also shown in FIG. 2. The flow data for the standard screw are significantly lower than for the vented barrier screw. The vented barrier will process more material from a given size of extruder.

Figure 3:
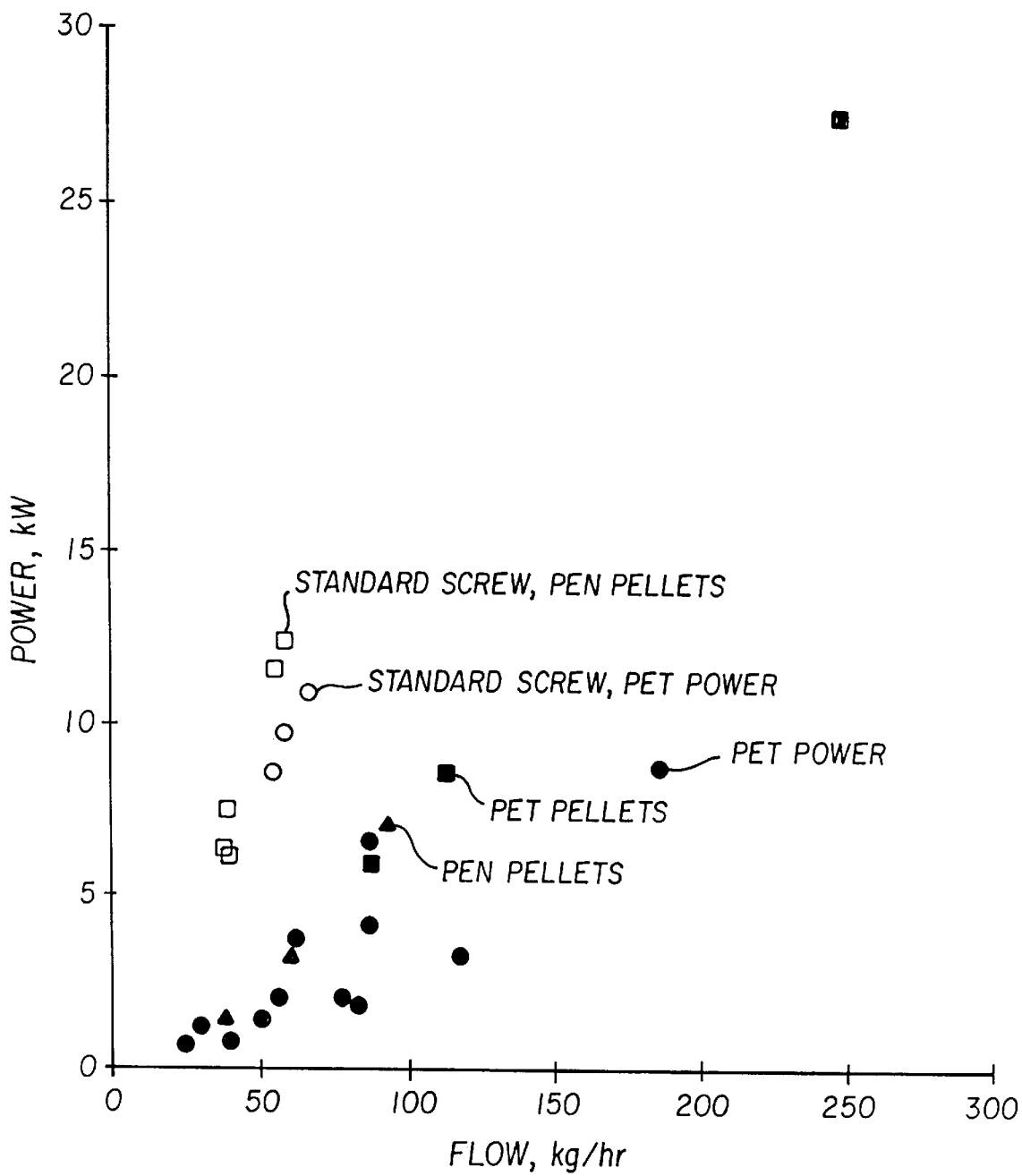
FIG. 3 is a graph of power versus rate for the vented barrier screw and the standard screw.

For the 63 mm extruder, FIG. 3 shows the power of the motor needed to process the resin versus rate. Power data for the vented barrier screw are shown and for a standard two-stage production type screw. The data for the prior art are correspondingly higher than those of the barrier screw. The vented barrier screw is capable of more rate than a standard screw for a given motor power.

For all polymers at all conditions excellent bubble free extrudate was obtained with a vacuum. In the case of PET powder, operation without a vacuum to atmospheric pressure resulted in some small bubbles in the extrudate. However, significant flow of gases from the screw bore were still observed when venting to atmospheric pressure. Completely plugging the venting system for PET powder resulted in a great amount of bubbles in the extrudate. Therefore, successful degassing of PET powder may require some vacuum, but significant degassing still does occur for venting to atmospheric conditions. For some powdered polymers of other applications, degassing to atmospheric pressure may be sufficient.

The invention has been described in detail with particular reference to certain preferred embodiments thereof, but it will be understood that variations and modifications can be effected within the spirit and scope of the invention.

What is claimed is:

1. A rotary screw extruder for extruding resin material and for removing volatiles therefrom comprising:

a barrel having a generally cylindrical chamber with a feed opening through said barrel into said generally cylindrical chamber;

a screw rotatably residing in said generally cylindrical chamber, said screw including a drive end, a feed section, a melting section and a pumping section, said feed section residing between said drive end and said melting section, said melting section residing between said feed section and said pumping section, said screw having at least one gas vent hole in said melt section positioned from about 0 to about 2 screw diameters from said feed section, said melting section including a pumping flight and a barrier flight, said barrier flight intersecting said pumping flight, said barrier flight having a radial height which is greater than a radial height of said pumping flight, said at least one gas vent hole residing between said pumping flight and said barrier flight; and an axial bore into said screw for venting gases from said barrel through said gas vent hole and into said axial bore.

2. The extruder of claim 1 wherein said at least one vent hole has a diameter at least as large as a diameter of said axial bore so as to not be a restriction to flow or a location of accumulation.

3. The extruder of claim 1 wherein at the beginning of the melting section and for two barrel diameters, the barrier flight radial height is greater than the pumping flight radial height.

4. The extruder of claim 1 wherein said screw includes a melt pumping channel between said pumping flight and said barrier flight, said melt pumping channel beginning at the intersection of said barrier flight with said pumping flight, said at least one gas vent hole residing in said melt pumping channel.

5. The extruder of claim 4 wherein said melting section of said screw includes a solids and melting channel adjacent said melt pumping channel.

6. A rotary screw extruder for synthetic resin extrusion comprising:

a barrel having a generally cylindrical chamber;

a screw rotatably residing in said generally cylindrical chamber, said screw including a drive end, a feed section adjacent said drive end, a melting section adjacent said feed section, and a pumping section adjacent said melting section, said melting section including a pumping flight and a barrier flight, a melt pumping channel between said pumping flight and said barrier flight, and a solids and melting channel adjacent said melt pumping channel, said barrier flight diverging from said pumping flight to form said melt pumping channel, said barrier flight having a radial height which is greater than a radial height of said pumping flight, said screw having at least one vent hole positioned in said melt pumping channel and from about 0 to about 2 screw diameters into said melting section from the end of said feed section; and an axial bore into said screw for venting gases from said barrel through said vent hole and into said axial bore.

7. The extruder of claim 6 wherein said at least one vent hole has a cross-sectional area not less than the cross-sectional area of said axial bore.

* * * * *